H. G. BOON AND C. A. FOURNESS.
SIZING TESTER.
APPLICATION FILED AUG. 23, 1920.
1,391,041.
Patented Sept. 20, 1921.
2 SHEETS—SHEET 1.
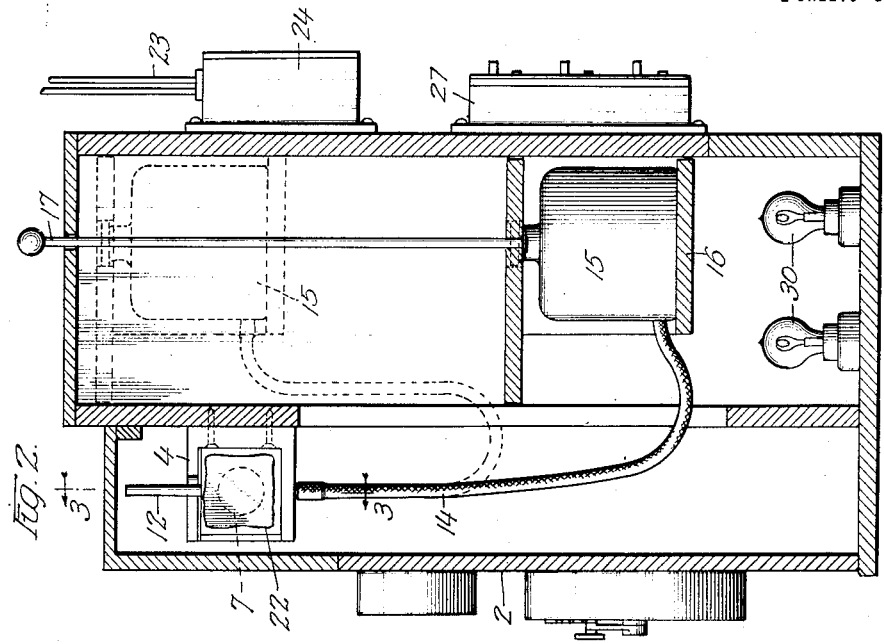
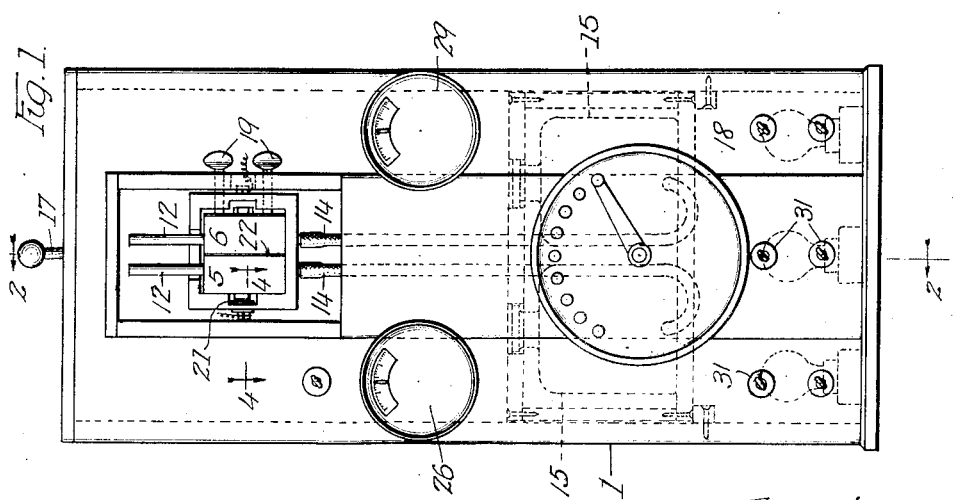
Inventor
Charles Albert Fourness
Henry G. Boon
Fisher Towle Clapp & Soans Attys.

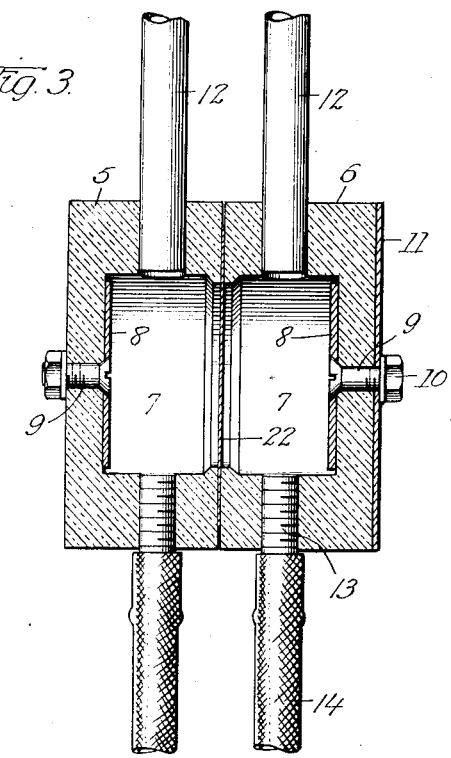
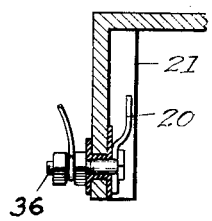
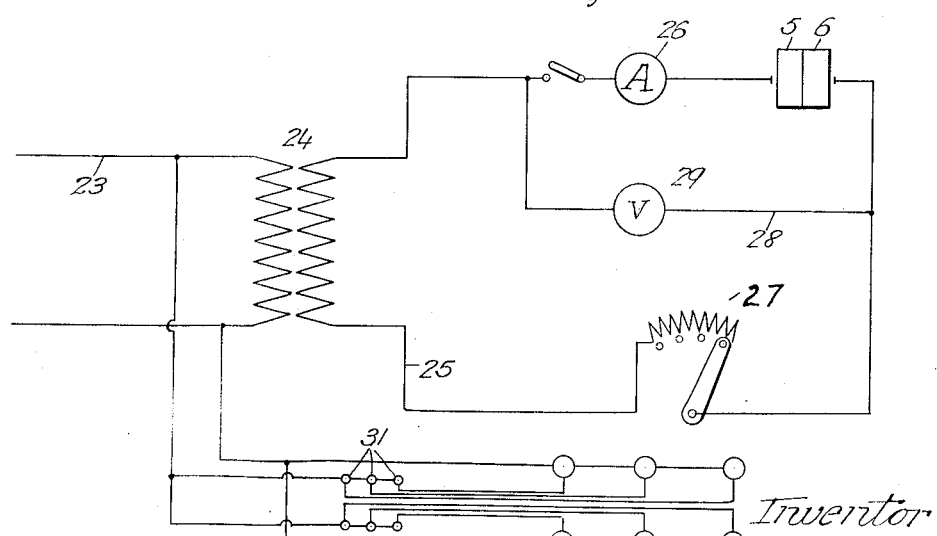

UNITED STATES PATENT OFFICE.

HENRY G. BOON, OF APPLETON, AND CHARLES ALBERT FOURNESS, OF NEENAH, WISCONSIN, ASSIGNORS TO KIMBERLY-CLARK COMPANY, OF NEENAH, WISCONSIN, A CORPORATION OF WISCONSIN.

SIZING-TESTER.

1,391,041.   Specification of Letters Patent.   Patented Sept. 20, 1921.

Application filed August 23, 1920. Serial No. 405,506.

*To all whom it may concern:*

Be it known that we, HENRY G. BOON and CHARLES ALBERT FOURNESS, citizens of the United States, residing, respectively, at Appleton, in the county of Outagamie and State of Wisconsin, and Neenah, in the county of Winnebago and State of Wisconsin, have invented certain new and useful Improvements in Sizing-Testers, of which the following is a specification.

Our invention has reference more particularly to a device for testing the character of paper with reference to the degree to which it has been sized, or the amount of sizing required to properly condition the paper for the particular use for which it is intended.

The sizing of paper is that treatment which renders it more or less impervious to ink, and the degree of sizing required varies according to the purpose for which the paper is to be employed. Paper which is insufficiently sized for printing purposes will absorb the ink and allow the printing to show through on the reverse side of the paper, and does not give a clear cut impression of the print, whereas paper which is too hard sized does not take the ink properly and results in a gray print with a black ridge of ink around the edges, caused by the ink being pressed out from under the type. Paper that is too hard sized is, therefore, unsatisfactory because of the character of impression which it takes and for the further reason that the ink dries on it very slowly and necessitates slow running of the press to allow time to dry and prevent blurring. It is therefore very important to be able to test the amount of sizing in paper in order to enable the manufacturer to secure the proper degree of sizing, and also in order to grade the paper and afford the printer a means of ascertaining or knowing the sizing characteristics of the paper which he proposes to use.

The objects of our invention are to provide a process and apparatus for testing the permeability of paper, either before or after sizing, to determine either the degree of sizing which the paper requires or the character or degree of sizing which the paper already contains; to provide a process and apparatus which enables the testing of the paper to be effected to a high degree of accuracy; to provide a process for testing paper which may be readily carried out by an inexperienced operator and does not require extraordinary skill; to provide a simple and inexpensive apparatus for testing paper; and, in general, to provide an improved process and apparatus by which it is possible to quickly and accurately secure information as to the size-taking characteristics of paper, or the amount of sizing contained in the paper without the difficulty of prolonged tests or danger of inaccuracy in the results.

On the drawings, Figure 1 is a front view of a testing device embodying our invention;

Fig. 2, a sectional view thereof on the line 2—2 of Fig. 1;

Fig. 3, an enlarged vertical sectional view of the paper clamp;

Fig. 4, an enlarged sectional view on the line 4—4 of Fig. 1, showing the electrical connection at one side of the paper clamp; and Fig. 5, a diagrammatic view of the wiring connections.

Referring to the drawings, the reference numeral 1 indicates a cabinet which may be of any suitable form or construction, having an extension 2 at the front, at the upper end of which is mounted a housing 4 in which the paper clamp is held during the testing operations. The paper clamp, as shown in Fig. 3, comprises two half-sections 5 and 6, each of which has a corresponding cavity 7 therein adapted to register with one another when the half-sections are placed side by side.

The inner faces of these half-sections are machined so as to fit tight together and hold a piece of paper therebetween during the operation of testing. These half-sections 5 and 6 are preferably made of glass or any other suitable insulating material, and each has a plate 8, preferably of copper, at the bottom of the cavity 7 and held in place by a bolt which projects through the side wall of the half-section and has a nut 10 turned thereon. The section 6, against which clamping screws are applied for pressing the sections 5 and 6 together, has a plate 11 on the outer face which is likewise held in place by the bolt 9. Each section has a glass tube 12 projecting upwardly from the top for ventilating purposes, and a nipple 13 at the bottom, and each nipple is connected by a hose 14 with a bottle or jar 15 in the cabinet 1, a separate bottle or jar being provided for each hose connection 14. The bottles 15 are mounted on a support 16 which is movable vertically in the cabinet and operated by a stem 17, and normally rests on the side strips or cleats 18 so that the jars 15 are below the position of the paper clamp and drain the compartments 7 in the clamp. The jars 15, however, in the operation of testing, are adapted to be lifted by the stem 17 to a position such as shown in dotted lines in Fig. 2, whereby the liquid in the jars 15 is caused to flow by gravity through the tubes 14 into the cavities 7 of the half-sections 5 and 6 when the latter are mounted in the housing 4.

The housing 4 is of suitable size to receive the half-sections 5 and 6 therein when the latter are arranged side by side, as shown in Fig. 3, and has a pair of set screws 19 at one side which serves to clamp the half-sections 5 and 6 together and also provide an electrical connection with the plate 11, which in turn is connected with the plate 8 at the inside of the half-section 6. Electrical connection is provided with the plate 8 of the other section 5, through a plate spring 20, which is positioned in a groove 21 in the side wall of the housing 4 and mounted in an insulated manner on the side wall of the housing 4, as shown in Fig. 4. In this manner, the testing blocks 5 and 6, when inserted in the housing 4, have the bolt 9 of the section 5 engaged with the spring 20, which is insulated from the housing 4, whereas the plate 8 of the section 6 is connected through the bolt 9 and plate 11 and clamp screws 19 with the housing 4.

In testing the paper, a small piece, as indicated at 22, is placed between the half-sections 5 and 6, and when the latter are placed in the housing 4 and clamped therein, the two compartments 7 of the sections 5 and 6 respectively are separated by the paper 22. A suitable solution is placed in the jars 15, which is capable of permeating the paper 22, and when the chambers of the half-sections 5 and 6 are filled with the liquid the latter will gradually permeate the paper 22, and as the paper becomes saturated will establish an electrical connection between the two plates 8, such connection gradually becoming more perfect as the saturation of the paper becomes more and more complete.

An electric circuit 23 is connected through a transformer 24 with a secondary circuit 25, the terminals of which are connected respectively to the binding post 36 of the spring contact plate 20, and to the housing 4, so that there is a gap in the circuit through the housing 4 which may be completed by the testing block 5—6 when the latter is filled with liquid communicating between the cells 7—7 of the sections 5 and 6 respectively. In the circuit through the testing block is an ammeter 26 which determines the amount of current passing through the testing block and thereby indicates the degree of saturation of the paper 22 in the testing block. The secondary circuit 25 is also provided with a rheostat 27 for regulating the voltage in the secondary circuit and also has a branch circuit 28 around the testing block 5—6 and ammeter 26, in which branch circuit is placed a volt meter 29, whereby the proper adjustment of the rheostat 27 may be determined.

The liquid which we prefer to employ in the jars 15 for testing paper is a sizing solution of ten per cent. glycerin and N/20 solution potassium chlorid (KCl), although it is possible that other solutions may be employed.

In the operation of testing, a piece of paper which has been sized to the proper degree and is satisfactory for a particular purpose, is placed in the device, and the length of time which it takes for the current to increase to a certain amount, as measured by the ammeter 26, is ascertained, and such length of time determines the sizing condition of the paper. Using this as a standard, the condition of other paper may be determined by inserting pieces of such other paper in the testing device and observing the length of time which it takes to arrive at the same reading or measurement on the ammeter. If it requires the same length of time, the sizing condition of both is the same, whereas, if more or less time is required to reach the same reading on the ammeter, the degree of sizing of the paper is thus found to be correspondingly greater or less. The comparison may also be made, if desired, by testing the standard piece of paper and the paper of which the sizing condition is to be determined, both for the same length of time and comparing the amount of current indicated by the ammeter in each case at the end of the fixed period of time.

It is very important that in making comparative tests the voltage of the secondary circuit should be the same in each test, and it is for this reason that the rheostat is provided—that is, so that the voltage may be regulated to correspond with the voltage at which the standard test is made, and the volt meter 29, of course, indicates the voltage at which the rheostat 27 is set. It is also important that the sizing solution used in making both tests should be the same and, furthermore, the temperatures of the solution should be the same, as a lower temperature not only increases the electrical resistance but also prolongs the time required for saturation, and differences in temperature would therefore impair the accuracy of the calculations.

In order to regulate the temperature of the testing liquid, we provide a number of lamps 30 in the base of the cabinet, which may be connected with either the primary or the secondary circuit as desired, the former connection being shown in the wiring diagram, and each of these lamps is controlled by a switch 31 so that any number of lamps may be lighted for the purpose of regulating the heat in the cabinet 1.

While we have shown and described our invention in a preferred form, we are aware that various changes and modifications may be made without departing from the principles of our invention, the scope of which is to be determined by the appended claims.

We claim as our invention:

1. The method of testing the permeability of a substance which consists in interposing the substance between separate charges of liquid, connecting the terminals of an electrical circuit respectively with the two charges of liquid, and determining the permeability of the substance by the saturation thereof as indicated by variations in the flow of current in the circuit.

2. The method of testing paper and like material which comprises clamping the paper in a block, introducing a separate charge of liquid into the block at each side of the paper, passing an electrical current through a circuit in which the paper and two charges of liquid are interposed, and measuring the current flowing in the circuit.

3. The method of testing the sizing condition of paper which comprises interposing the paper in an electrical circuit, subjecting the paper to a liquid and determining the saturation of the paper by the flow of current in the circuit.

4. In an apparatus of the class described, the combination of means for holding a piece of paper between a pair of chambers, means for filling both chambers with a liquid, an electrical circuit having the terminals connected respectively with the liquid in the two chambers, and means for determining the flow of current in the circuit.

5. In an apparatus of the class described, the combination of an electrical circuit having means interposed therein for containing a liquid and adapted to receive a piece of paper in position to interrupt the circuit and be subjected to the liquid, and means for measuring the flow of current in the circuit.

HENRY G. BOON.
CHARLES ALBERT FOURNESS.